US012743313B2

(12) United States Patent
Hadad

(10) Patent No.: US 12,743,313 B2
(45) Date of Patent: Sep. 22, 2026

(54) FUNCTION-AS-A-SERVICE PLATFORMS FRAMEWORK DEPLOYMENT WITH CREATION OF POOL OF PRE-INITIALIZED SERVERLESS FUNCTION FOR SOFTWARE FUNCTION SERVICES

(71) Applicant: International Business Machines Corporation, Armonk, NY (US)

(72) Inventor: Erez Hadad, Nahariya (IL)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 17/315,422

(22) Filed: May 10, 2021

(65) Prior Publication Data

US 2022/0357994 A1 Nov. 10, 2022

(51) Int. Cl.
*G06F 9/50* (2006.01)
*G06F 9/455* (2018.01)
*G06F 9/48* (2006.01)

(52) U.S. Cl.
CPC ........ *G06F 9/5038* (2013.01); *G06F 9/45558* (2013.01); *G06F 9/4881* (2013.01); *G06F 9/5077* (2013.01); *G06F 2009/45591* (2013.01)

(58) Field of Classification Search
None
See application file for complete search history.

(56) References Cited

U.S. PATENT DOCUMENTS 8,245,190 B2 * 8/2012 Buskens ................ G06F 9/485 709/229
8,683,454 B1 * 3/2014 Muggli .................... G06F 8/51 717/159
9,557,967 B1 * 1/2017 Clarke ................ G06F 16/9535
10,565,034 B2 2/2020 Zhang
11,182,206 B2 * 11/2021 Jung ....................... G06F 9/542
2005/0246708 A1 * 11/2005 Turner .................. G06F 9/4843 718/102

(Continued)

OTHER PUBLICATIONS

Beswick, "New for AWS Lambda—Predictable Start-Up Times with Provisioned Concurrency", AWS Compute Blog, 11 P., Dec. 4, 2019.
Byrro, "Can We Solve Serverless Cold Starts?", Retrieved from the Internet Blog, 8 P., Mar. 20, 2019.

(Continued)

*Primary Examiner* — Zujia Xu
(74) *Attorney, Agent, or Firm* — Teddi E. Maranzano

(57) ABSTRACT

Provided herein are methods and systems for providing a function as a service in a predictably timed manner, for example within a deadline or in a given frequency. A specialized executor function, namely a custom runner, is called from the function service using a wrapper function on the framework controller. The process allocates some, or all of the required computing resources required to execute a function on the initialization stage, based on foresight. The custom runner function may keep the resources for expected function service requests, or terminate in accordance with prediction rules thereof. The disclosure supports different platforms, and custom scheduling algorithms, for real-time use-cases, demand prediction, custom function execution, and the like. The disclosure mitigates overhead due to startup and shutdown delays, which may be incurred by opening and closing a database connection, loading and unloading a neural network to physical memory, and the likes.

3 Claims, 9 Drawing Sheets

(56) References Cited

U.S. PATENT DOCUMENTS

2006/0277409 A1* 12/2006 Galwas ............... G06F 21/6209 713/176
2007/0288649 A1* 12/2007 Song ................ G06F 16/24568 370/458
2008/0155572 A1* 6/2008 Kolathur .................. G06F 8/76 719/327
2012/0324484 A1* 12/2012 Fried ........................ G06F 8/41 719/331
2015/0135261 A1* 5/2015 Park ...................... H04L 63/102 726/4
2016/0019077 A1* 1/2016 Ourfali ................. G06F 9/5077 718/1
2018/0107503 A1* 4/2018 Machida ............... G06F 9/5066
2019/0102231 A1* 4/2019 Wagner ............... G06F 9/45558
2019/0196879 A1* 6/2019 Dutta ...................... G06F 9/505
2019/0294479 A1* 9/2019 Pan ..................... H04L 41/0806
2019/0312899 A1* 10/2019 Shulman ............. H04L 63/1425
2020/0167669 A1* 5/2020 Lei ......................... G06N 3/105
2020/0225983 A1* 7/2020 Jung ..................... G06F 9/5027
2021/0144013 A1* 5/2021 Chen ..................... H04L 9/0894
2021/0318745 A1* 10/2021 Manousakis ........ G06F 9/45558
2022/0350748 A1* 11/2022 Qian ..................... G06F 9/5016
2023/0195946 A1* 6/2023 Liu ......................... G06F 21/85 726/26

OTHER PUBLICATIONS

Chard et al., "Serverless Supercomputing: High Performance Function as a Service for Science", ArXIV Preprint ArXivP: 1908. 04907v1, p. 1-13, Aug. 14, 2019.
Ibryam, "Kubernetes Workloads in the Serverless Era: Architecture, Platforms, and Trends", Red Hat Summit 2019, 29 P., 2020.
Ling et al., "Pigeon: A Dynamic and Efficient Serverless and FaaS Framework for Private Cloud", 2019 International Conference on Computational Science and Computational Intelligence (CSCI), p. 1416-1421, 2019.
Pellgrini et al., Function-as-a-Service Benchmarking Framework, Proceedings of the 9th International Conference on Cloud Computing and Services Science, p. 479-487, 2019.

* cited by examiner

Common FaaS Deployment

FaaS + Disclosure Framework Deployment

Fast wrapper functions - small, stateless and native
Can invoke framework API async to reduce cost Common FaaS Deployment FaaS + Disclosure Framework Deployment Common FaaS Deployment FaaS + Disclosure Framework Deployment

- func1.py – naïve serverless function implementation

```
import db


def count(name):
    conn = db.get_connection()
    records = conn.exec("select * from citizen where
name=" + name)
    conn.close()
    return records.count
```

FIG. 9A

- func2.py – framework function implementation

```
import db
conn = None
def init():
    conn = db.get_connection()


def count(name):
    records = conn.exec("select * from citizen where
name=" + name)
    return records.count


def fin():
    conn.close()
```

FIG. 9B

FUNCTION-AS-A-SERVICE PLATFORMS FRAMEWORK DEPLOYMENT WITH CREATION OF POOL OF PRE-INITIALIZED SERVERLESS FUNCTION FOR SOFTWARE FUNCTION SERVICES

FIELD AND BACKGROUND OF THE INVENTION

The present invention, in some embodiments thereof, relates to network computing services, and more particularly, but not exclusively, providing a function as a service in a predictably timed manner.

Computing needs of many organizations, as well as power end users, are often hard to answer using a local, monolithic server, therefore the practice of using a network of remote server accessible through the internet to store, manage, and process data, namely cloud computing has become prevalent in many applications. This enables on-demand computer system resources, such as data storage, specialized processing, processing power, and the like, while delegating the system management to reputed service providers. Function-as-a-Service platforms (FaaS or FAAS), which are also known as serverless platforms, have become ubiquitous in the cloud eco-system, since their introduction during the mid-2010s.

Serverless platforms offer several features for developing cloud-scale applications, which are quite attractive for developers. For example, they allow developers to define their application as a set of functions. Cloud service providers, as well as third parties provide simple tools, which developers can use to deploy these functions, and then set them to be invoked in response to events, such as invocations from other functions or services, or to invocations from a higher-level orchestration mechanism. Orchestration may involve tools enabling pipelines for authoring, scheduling, monitoring and the like, during continuous integration and either continuous delivery such as Argo, Tekton and Composer.

Functions may be deployed in containers, which may be lightweight, platform independent and straightforward to deploy. Function deployments in containers may be automatically scaled out or in by the FaaS platform in response to invocation load, and down to no containers at all, namely scale-to-zero. FaaS programming enables using functions written in various programming languages and/or based on different assumptions on hardware, operating systems, and the like, adhering only to a prescribed invocation and return protocol, i.e., required parameters and return value format. Platforms provide a standardized approach for building and deploying distributed code, and may enable use of containers, for example the Open Container Initiative.

Programmers can implement distributed software flows of interest gradually, for rapid prototyping of applications. Furthermore, cloud providers may bundle their FaaS offering with usage based billing, where cost is incurred only for actual use of resources when functions are invoked. Such a model may be preferred, especially when high workload variability is expected, as in many applications.

These features may enable development models where developers needs to focus only on the code, without caring for life-cycle of the underlying server infrastructure, even at scale, hence the nickname “serverless”. Major cloud providers may offer FaaS services for the increasing demand, and may bundle these offerings with additional features such as workflow orchestration, batch/stream computing, and optimized connection to various data sources such as object storage, execution tracing, and more.

SUMMARY OF THE INVENTION

It is an object of the present disclosure to describe a system and a method for providing real time software function services using at least one computing node, executing at least one virtual machine, running one or more customized functions in platform level processes to which computing resources are allocated independently of specific events bound to the function service.

According to some embodiments of the present disclosure, there is provided a system, comprising:

at least one computing node providing a plurality of users with a platform comprising a plurality of software function services;
- wherein the at least one computing node is configured to:
- start a customized platform level process bound to a function service;
- invoke the function service to execute a specialized executor function from the customized platform level process;
- perform at least one initialization step, comprising allocating computing resources to the customized platform level process; and
- when an event bound to the function service is triggered:
  - call at least one service function executed by the specialized executor function for executing the function service using the allocated computing resources;
  - receive by the specialized executor function a generalized return value from the at least one service function; and
  - apply the generalized return value in response to the event.

According to some other embodiments of the present disclosure, there is provided a computer implemented method, using at least one computing node to provide a plurality of users with a platform comprising a plurality of software function services, the computer implemented method comprising:

start a customized platform level process bound to a function service;
- invoke the function service to execute a specialized executor function from the customized platform level process;
- perform at least one initialization step, comprising allocating computing resources to the customized platform level process; and
- when an event bound to the function service is triggered:
  - call at least one service function executed by the specialized executor function for executing the function service using the allocated computing resources;
  - receive by the specialized executor function a generalized return value from the at least one service function; and
  - apply the generalized return value in response to the event.

Optionally, a computer readable medium having instructions stored thereon, which, when executed by a computer, cause the computer to carry out the computer implemented method of some embodiments of the present disclosure.

Optionally, further comprising following applying the generalized return value in response to the event, terminating the specialized executor function and its surrounding customized platform level process and freeing the computing resources in accordance to a customized policy.

Optionally, at least one other computing node is configured to execute an additional customized platform level process, configured to:

- when a platform transparent custom controller indicates an event independent scheduling initialization, start an additional customized platform level process on top of the platform;
- execute the additional specialized executor function from the additional customized platform level process by invoking the function service;
- allocate different computing resources to the additional customized platform level process; and
- when a different event bound to the function service is triggered:
  - call the at least one service function executed by the additional specialized executor function called by the additional customized platform level process, for executing the service function using the different computing resources;
  - receive by the additional specialized executor function called by the additional customized platform level process, a generalized return value from the at least one service function; and
  - apply the generalized return value in response to the different event.

Optionally, the computing resources store data modified by the service function, and further comprising when a different event bound to the function service is triggered:

- call at least one other service function for executing function service by the CR using the computing resources;
- receive a generalized return value from the at least one other service function; and
- apply the generalized return value in response to the different event.

Optionally, communicating with a controller on an additional computing node and the controller implementing a function graph comprising a plurality of event states, and the event bound to the function service is triggered by a state or an edge of the function graph.

Optionally, communicating with a controller on an additional virtual machine, and the controller implementing a mapping, for allocating events bound to the function service to the specialized executor function called from the customized platform level process according to a mapping rule, using a wrapper function.

Optionally, communicating with a controller on an additional virtual machine, and the controller implementing a scheduling, for allocating service requests to the specialized executor function called from the customized platform level process according to a user-customizable scheduling rule.

Optionally, wherein the computing resources comprise at least one member of a group consisting of: a memory range, a communication channel, a central processing unit, and a graphical processing unit.

Optionally, communicating with a controller on an additional virtual machine, and the controller implementing a user-customizable load prediction method, and controls a mutable number associated with a pool, and the pool comprises the mutable number of specialized executor functions.

Optionally, wherein the platform comprising a first deployment tool provided by the platform, and further comprising a second deployment tool, consistent with the first deployment tool, and useable for creating pools of function with customizable load prediction and scheduling, and generating wrapper functions for transparently invoking functions in the specialized executor functions from the pools, like regular service functions.

Optionally, further comprising receiving instructions to the specialized executor function to perform finalization, comprising freeing the computing resources and terminating, in response to an event from a controller on an additional computing node.

Optionally, wherein at least one function is executed in a mode, wherein the function is split to at least two parts, each part bound to different events, at least one part comprises at least one initialization step, comprising allocating computing resources to the customized platform level process, at least one part comprises an execution step, applying the generalized return value in response to the different event, and at least one part comprises freeing the computing resources and terminating.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 8:
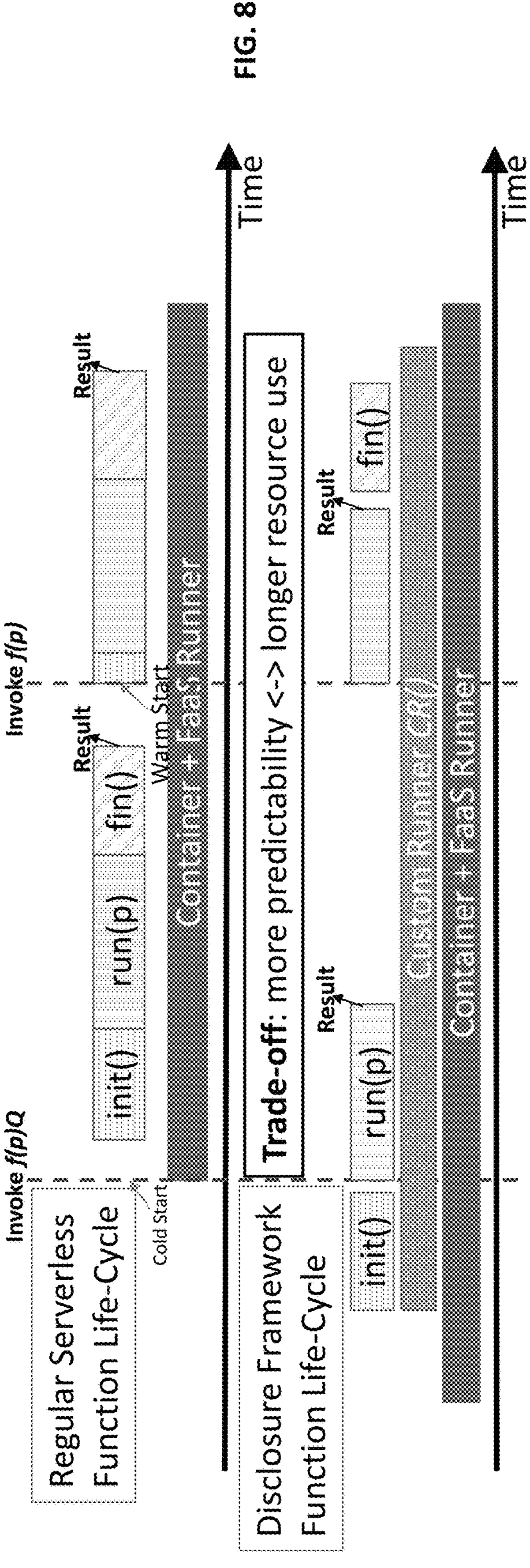

FIG. 8 demonstrates a sequence of regular monolithic execution of an exemplary serverless function from beginning to end on the left or top, and a partitioned execution of the same exemplary function using the disclosure framework according to some embodiments of the present invention on the bottom or right, according to some embodiments of the present disclosure;

FIG. 9A shows an exemplary code segment of a function, according to some embodiments of the prior art; and FIG. 9B shows a rewrite of the exemplary function shown in FIG. 9A, partitioned into 3 sub-functions to be used by the disclosure framework, according to some embodiments of the present disclosure.

DESCRIPTION OF SPECIFIC EMBODIMENTS OF THE INVENTION

The present invention, in some embodiments thereof, relates to network computing services, and more particularly, but not exclusively, providing a function as a service in a predictably timed manner.

Serverless application models may be event-driven, and comprise binding events to functions, or the code. However, many event-driven applications, such as data streaming, GUI, gaming, stock exchange, system control, and the like tend to impose additional requirements of responsiveness predictability, which may also be referred to as real-time requirements, such as latency, compliance with a deadline, a minimum frequency and the like. It should be noted that an event may refer to all methods of calling a function, by a sequential code, accessing an object property, binding a function to a graphic user interface (GUI) element, a sensor indication, and/or the like.

However, FaaS platforms are often distributed in a manner encumbering on meeting such requirements, and serverless solutions often suffer from a high execution overhead upon startup, shutdown, and or difficulty of real-time scheduling. One of the known issues of serverless function execution is initialization overhead, which is also referred to as cold start. This issue may cause a significant latency, which may be of many milliseconds and even seconds, required for initializing a new instance of a function to respond to an invocation or event. This may happen because each new function may be deployed in a separate container. Therefore, the time for scheduling the new container, starting it, and populating it with the specific function's data and/or code is aggregated together into the cold start overhead.

The problem may be exacerbated with application functions that require significant initialization and/or finalization. Additional operation beyond result generation may include cleanup, database lock releases, erasure of sensitive data, and the like. Such requirements are common in stateful computation, such as updating one or more shared state in a database or object storage in response to an event. Serverless functions are stateless in nature, requiring all shared state to be loaded on-demand and stored back after processing. This may pose additional application-specific overheads that are also significant and may account for a bottleneck, having a major influence on the total function execution time.

Opening a database connection, for example, may take as much as 30 seconds. The I/O intensive and dependence on external services, such initialization and finalization may be highly variable in nature, further affecting total execution predictability.

Mitigating initialization overhead is typically handled by maintaining pools i.e. collections or sets of pre-initialized functions that are ready for immediate invocations, which may remove the initialization overhead from the critical path. However, maintaining such pools means extra resource usage, which implies additional costs.

Therefore, effective scaling of the pool to accommodate for varying load is an important feature. Some implementations may aim to maintain the pool for the biggest burst size, which may not be known up-front, or be too costly. Some implementations comprise demand prediction logic.

Furthermore, the actual code of a function may also be a source or unpredictability, especially the code in a critical invocation path. A function's code may interact with a plurality of services, and/or engage with I/O operations, which are generally unpredictable in cloud environments.

Four features, may be required for effective real time features in serverless applications: First, custom scheduling of functions, which may be suited for real-time, for example, deadline-aware scheduling. Second, Mitigation of initialization and finalization overheads associated with each function, at both infrastructure and application levels, by removing at least some of these costs from the critical invocation path. Third, demand prediction and matching dynamic scaling of pools of pre-initialized functions to accommodate expected varying workload. Auto-scaling in response to predicted demand is a baseline example. And last, predictable computation of the general function code, for example by optimizing services that the function is supposed to use, such as data or state storage.

Some implementations of the present disclosure, apply a proposed framework for delivering custom scheduling and predictable execution of serverless functions, which may be implemented on top of any existing FaaS platform, and convey a development experience that is highly consistent with that of the original FaaS platform.

Some implementations of the proposed framework handle several aspects of predictable execution using Custom Runners (CRs), which may comprise specialized executor functions. CRs by themselves are executed as standard serverless functions, which may run on a container, or another environment supported by the VM. CRs execute FaaS functions internally according to a model and schedule that may be tailored to the framework embodiment and different from that of the FaaS platform. For the purpose of real-time execution, CRs may support separation of the regular FaaS functions to sub-functions of "initialization", "running" and "finalization", wherein the initialization and finalization may be executed outside the critical invocation path.

Some implementations of the proposed framework comprise custom scheduling that may be different from the scheduling of the FaaS itself. Thus, the framework may provide a scheduling solution that is tailored for the specific real time constraints.

Some implementations of the proposed framework apply wrapper functions to mask the framework, or service functions (i.e., functions executed inside CRs) as regular serverless functions, so that they may be transparently invoked from the underlying FaaS platform in response to events, code invocations or FaaS orchestration.

Some implementations of the present disclosure manage a plurality of pools, and/or a plurality of functions. Some implementations may allow a pool to serve more than one function. This sharing may be preferable when the initialization required for these functions is similar, or for data sharing. When the computing resources store data modified by the service function, another service process may access them using the same pool, or a different pool with different triggering and wrapper function, using shared allocation. It should be noted that service function or process may refer to a process on the same or a different container, VM and/or the like, which comprises executing at least part of the function as instructed by one or more other processes.

Following a call to at least one other service function for executing function service by the same CR using the same computing resources the calling CR may receive a generalized return value from the at least one other service function, and apply the generalized return value in response to the different event. As used herein, the term generalized return value may refer to values the function returns explicitly, or through messaging, by updating a shared memory or other means, and mere indication the function execution was completed such as what void functions in C return.

The custom runner needs the code of the service function to execute inside it. That code may be deployed together with the CR, or may be dynamically fetched from various locations such as web links, object storage and alike. Alternatively, a framework controller may also start an additional customized platform level process on top of the platform, call the CR therefrom and allocate different computing resources thereto, either as a part of the same pool or of a different pool. when a different event bound to the function service is triggered the same, or a compatible service function may be called from the additional CR, or the additional specialized executor function, called by the additional customized platform level process, for executing the function service using the different computing resources. Followingly the additional CR or the additional specialized executor function called by the additional customized platform level process, may receive a generalized return value from the at least one service function, and apply the generalized return value in response to the different event. The CR may run on the same, or another computing node.

The custom runner may bind the customized platform level process to one or more associated function services, as the function service used to execute the specialized executor function may be invoked from the customized platform level process The pool size is a mutable number associated with a pool, which controls the number of specialized executor functions, and may be any non negative integer. Starting additional Custom Runners (by invoking them as FaaS functions) may be beneficial for increasing the pool size for frequent functions, while allocating CRs to a different pool may be beneficial for a binding a different function to a different type of events. The pool size increment may be initiated by a platform transparent custom controller indicates an event independent scheduling initialization, and result in starting one or more additional customized platform level processes on top of the platform. This may allow the system to execute additional specialized executor functions from the additional customized platform level processes by invoking the function service. The customized controller may implement a user-customizable load prediction method, and control the pool size in accordance to the prediction.

Some implementations of the present disclosure implementing additional FaaS features in a portable manner, on top of an existing FaaS platform, without requiring any changes to it, thus preserving and leveraging the existing FaaS infrastructure investment.

Before explaining at least one embodiment of the invention in detail, it is to be understood that the invention is not necessarily limited in its application to the details of instructions and the arrangement of the components and/or methods set forth in the following description and/or illustrated in the drawings and/or the Examples. The invention is capable of other embodiments or of being practiced or carried out in various ways.

Figure 1:
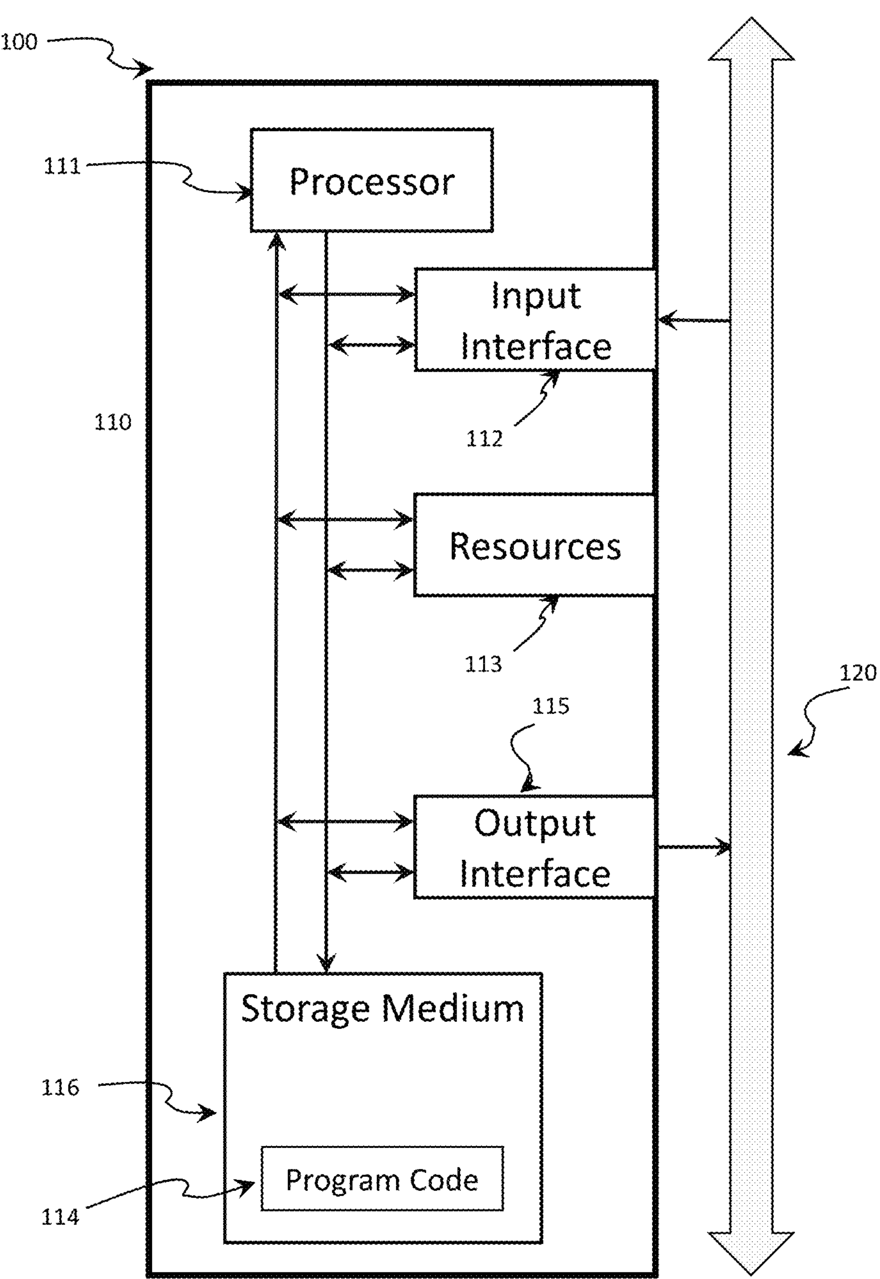
FIG. 1 is a schematic block diagram of an exemplary computing node executing a plurality of virtual machines, according to some embodiments.

Referring now to the drawings, FIG. 1 which is a schematic block diagram of an exemplary computing node executing a plurality of virtual machines, according to some embodiments.

The computing node 110 may include an input interface 112, an output interface 115, one or more processors 111 for executing processes such as 200 and/or 300, and storage 116 for storing code (program code storage 114) and/or data. The computing node may be placed in a computer farm, as an independent system or a card in a rack, and may also be remotely located.

The input interface 112, and the output interface 115 may comprise one or more wired and/or wireless network interfaces for connecting to one or more networks, for example, a local area network (LAN), a wide area network (WAN), a cellular network, the internet and/or the like. The input interface 112, and the output interface 115 may further include one or more wired and/or wireless interconnection interfaces, for example, a universal serial bus (USB) interface, a serial port, and/or the like. Furthermore, the output interface 115 may include one or more wireless interfaces for communicating with fixed and/or mobile devices, and the input interface 112, may include one or more wireless interfaces for receiving information from one or more devices. Additionally, the input interface 112 may include specific means for communication with one or more sensor devices 122 such as a controller, a keyboard and/or the like. And similarly, the output interface 115 may include specific means for communication with one or more display devices 125 such as a loudspeaker, display and/or the like.

The one or more processors 111, homogenous or heterogeneous, may include one or more processing nodes arranged for parallel processing, as clusters and/or as one or more multi core one or more processors. The storage 116 may include one or more non-transitory persistent storage devices, for example, a hard drive, a Flash array and/or the like. The storage 116 may also include one or more volatile devices, for example, a random access memory (RAM) component and/or the like. The storage 116 may further include one or more network storage resources, for example, a storage server, a network attached storage (NAS), a network drive, and/or the like accessible via one or more networks through the input interface 112, and the output interface 115. Data may be stored on volatile system memory, however the storage may also comprise computer readable media.

Computer readable medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a remote web or cloud service, and any suitable combination of the foregoing.

The one or more processors 111 may execute one or more software modules such as, for example, a process, a script, an application, an agent, a utility, a tool, an operating system (OS) and/or the like each comprising a plurality of program instructions stored in a non-transitory medium within the program code 114, which may reside on the storage medium 116. The resources 113 may comprise further storage such as disk space, volatile and non-volatile memory, specific memory such as Video RAM (VRAM), dedicated processors such as DSP, GPU, AI accelerators, and the like, dedicated code, programmable devices, application specific integrated circuits (ASIC), and/or the like.

Figure 2:
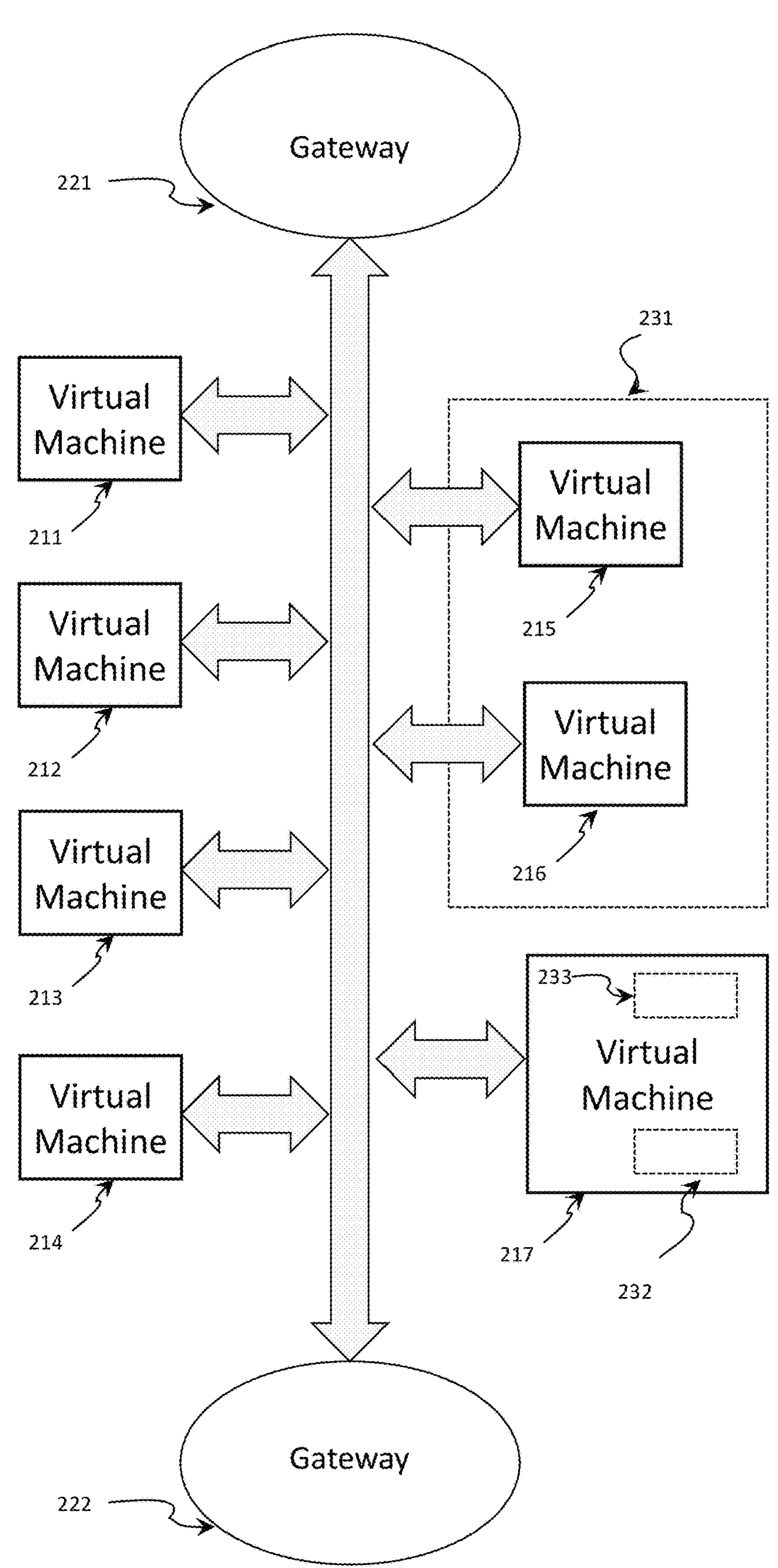
FIG. 2 shows an exemplary system, comprising computing nodes, according to some embodiments of the present disclosure.

Referring now to, FIG. 2 which shows an exemplary system, comprising computing nodes, according to some embodiments of the present disclosure.

The network may be used for providing a plurality of users with a platform comprising a plurality of software function services, and labelled as a LAN, WAN, a cloud service, a network for software as a service (SaaS), function as a service (FaaS), a compute server, and/or the like. The network may allow communication with virtual machines functioning as computing nodes, as shown in 211, 212, 213, 214, 215, 216 and 217. The correspondence between virtual machines and physical machines may be of any positive rational number. For example, the physical machine shown in 231 hosts both virtual machines 215 and 216, however, the virtual machine 217 is implemented by both physical machines 232 and 233.

The network may interface the outside network, e.g. the internet, through gateways such as 221 and 222. Gateways may comprise features such as routing, security, load management, billing, and/or the like however some, or all of these features may also be otherwise handled by other machines in or outside the network.

Figure 3A:
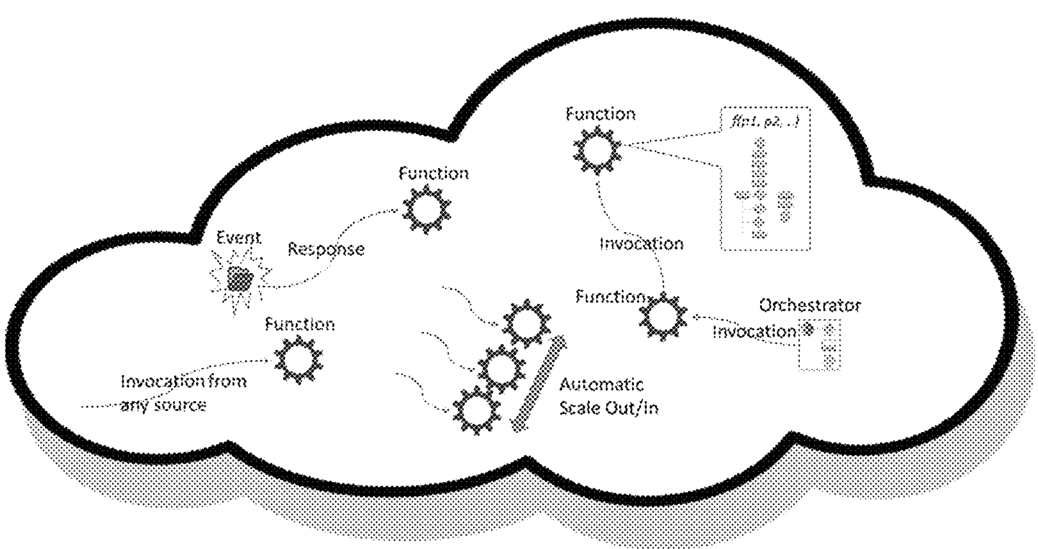
FIG. 3A illustrates an exemplary common FaaS deployment, distributed over a cloud, according to some embodiments of the prior art.

Reference is now made to FIG. 3A which illustrates an exemplary common FaaS deployment, distributed over a cloud, according to some embodiments of the prior art.

An event or an invocation from any source, for example from another service or from an orchestrator, may trigger an instance of a function. The resources required for executing the functions may be reserved and released by automatic scale out/in. a function may have several parameters, for example p1 and p2 as shown, and match a flowchart. Additionally, an orchestrator may be used for function invocation. The orchestrator may be a custom controller on an additional virtual machine, communicating with the customized platform level processes.

Figure 3B:
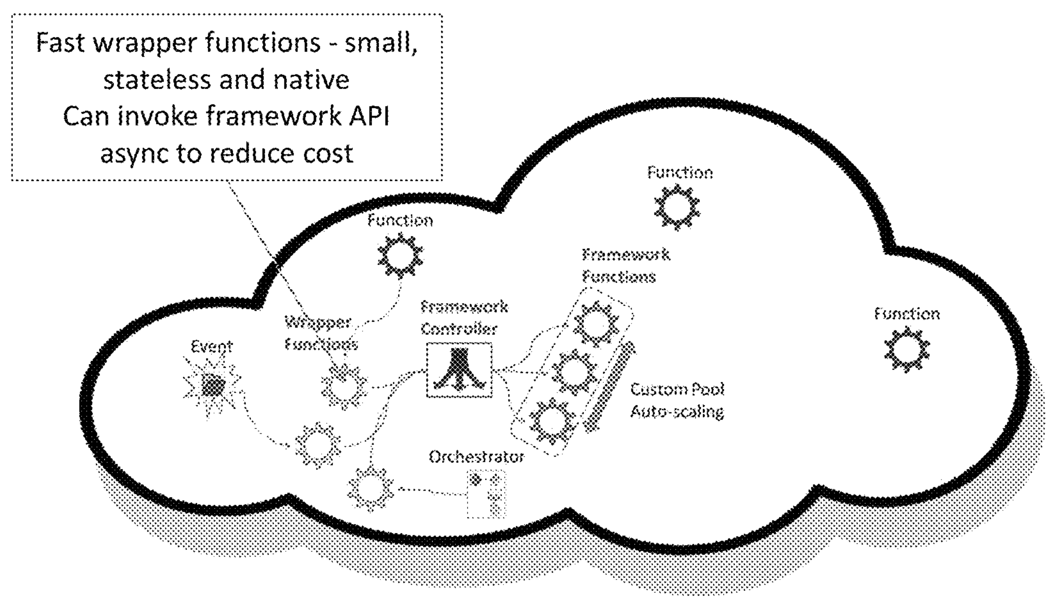
FIG. 3B illustrates an exemplary framework deployment on FaaS, distributed over a cloud according to some embodiments of the present disclosure.

Reference is now made to FIG. 3B which illustrates an exemplary deployment of the disclosure framework on FaaS, distributed over a cloud according to some embodiments of the present disclosure. Framework functions may be invoked using the serverless platform's protocol similar to FIG. 3A: from an orchestrator, from other code or by events. The serverless invocation is relayed through fast wrapper functions, which are small, stateless and native to the FaaS platform. Wrapper functions may relay the serverless invocation to the framework controller, which will pass the invocation to a framework function in its pools. Wrapper functions may operate asynchronously when possible (e.g., for event handling) to reduce the overhead of the wrapper functions themselves.

Wrapper functions, being regular FaaS functions, may also experience initialization overhead. However, note that wrapper functions are purely stateless, so they require no application initialization. Additionally, wrapper functions may have a very small memory footprint and may consist of pure native code, so they may be quick to schedule and execute. The average cold-start of wrapper functions may be further reduced using periodical warming. In some platforms such as Knative, events may be forwarded directly to the framework controller deployed as a Kubernetes Custom Resource controller, thus removing the need for wrapper functions.

Framework functions may undergo execution that is different from the regular FaaS functions. In some implementations of predictable execution, specific sections of the function code may be marked as "initialization" and "finalization". The "initialization" and "finalization" or parts thereof may be executed outside the critical invocation path. This may be done using specialized executor functions, which may be referred to as custom runners (CRs), and are responsible for executing the framework function internally.

The custom scheduling of the framework functions may be different from the scheduling of the FaaS itself. Thus, the framework may provide a scheduling solution that is tailored for the specific problem. For example, within a frequency range, or real-time scheduling. The tailored scheduling may be executed by a customized controller.

The wrapper functions may mask the framework functions to appear as regular serverless functions, so that they may be transparently invoked from the underlying FaaS platform in response to events, code invocations, FaaS orchestration, and/or the like.

Figure 4A:
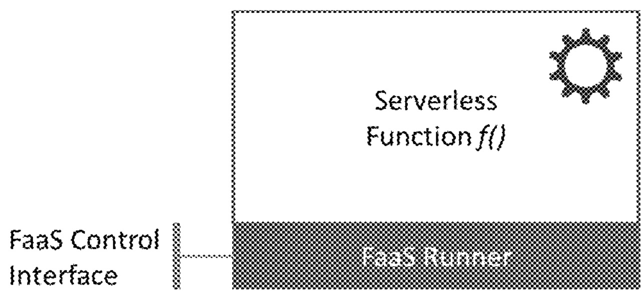
FIG. 4A shows an exemplary layer structure of a common FaaS, according to some embodiments of the prior art.

Reference is now made to FIG. 4A which shows an exemplary layer structure of a common FaaS, according to some embodiments of the prior art.

A common FaaS deployment may comprise two layers. Inside each FaaS container there may be a serverless function f( ) and a FaaS runner having a FaaS control interface. The serverless function may be automatically deployed over the FaaS runner as part of the serverless function execution, enabling the programmer to focus on the functionality, and allowing the FaaS layer to manage the actual serverless implementation and execution of the function. This may be referred to as regular serverless function.

A runner is a common term in FaaS platforms for the fixed code that exists in the serverless function's container and comprises the execution environment for the function's code. In a typical FaaS platform that supports different programming languages, there would be a separate runner for each language. Each function is deployed to a container with a specific runner that matches the function's language.

Figure 4B:
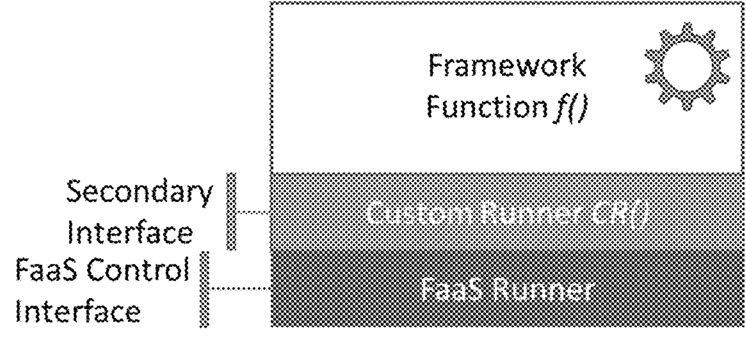
FIG. 4B shows an exemplary layer structure of a Framework on FaaS according to some embodiments of the present disclosure.

Reference is now made to FIG. 4B which shows an exemplary layer structure of a Framework on FaaS according to some embodiments of the present disclosure.

A FaaS comprising the disclosure framework deployment also comprises the serverless function f( ) and a FaaS runner. Between them a custom runner (CR) is added. The CR may have a secondary interface.

As in FIG. 4A, the FaaS runner may provide interface through which the FaaS platform may remotely controls the execution of the function over the runner.

The disclosed custom runner may be a function, and therefore may be deployed as a serverless function in itself on top of a standard FaaS runner. On the other hand, it is also a runner, and therefore may be used to execute functions inside it and control their execution. It may be implemented as a function CR( ) that accepts at least two parameters: a function f( ) and a set of parameters p. It returns the result: CR(f, p)=f(p) by executing f internally on the parameters in p and returning the result. CR( ) may be deployed as a regular FaaS function, and new CRs may be instantiated by simply invoking CR( ) as a FaaS function.

Furthermore, when CR(f, p) executes f(p), it may also pass to f( ) any special parameters provided by the underlying FaaS platform, such as context objects that may be available in various cloud service platforms. This enables the development of f( ) to resemble to that of a regular serverless function in the underlying FaaS platform.

Figure 5:
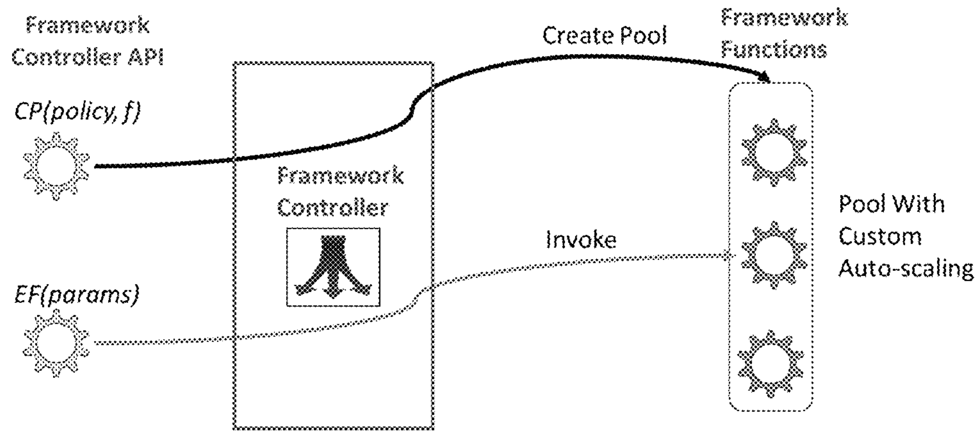
FIG. 5 shows exemplary functions (API) of an exemplary disclosure framework controller, one (CP) for deploying a pool of framework functions and another (EF) for invoking functions inside the pool, according to some embodiments of the present disclosure.

Reference is also made to FIG. 5, which shows exemplary functions (API) of an exemplary disclosure framework controller, one (CP) for deploying a pool of framework functions and another (EF) for invoking functions inside the pool, according to some embodiments of the present disclosure;

The framework controller API may provide interface to the pool with custom auto-scaling of framework functions for the CRs. The CP function causes the framework controller to create a pool, and the EF functions by invoking a function using the pool.

Based on the disclosed components, the framework may likely support the following operations listed below. These operations may be exported either as generic controller API to be consumed directly for example by a generic task-based systems. Alternatively, these operations can be exported as FaaS functions for consumption in the FaaS eco-system. One operation is "Create pool" (CP)—using arguments of a pool policy and function f, build and maintain a dynamic pool of pre-initialized instances of f running in CRs. The result of the operation is a new pool with an identifier. Another operation is "Execute function" using the pool (EF)—using argument of pool identifier and invocation parameters, invoke one instance of the function running in the pool specified by the pool identifier. The result of the operation is the function invocation result. There could be additional operations for any given implementation of the framework. For example, a likely operation is remove an existing pool, to stop being billed for it when it is not used anymore.

Figure 6A:
FIG. 6A shows an exemplary common FaaS deployment, according to some embodiments of the prior art.

Referring now to FIG. 6A which shows an exemplary common FaaS deployment, according to some embodiments of the prior art.

A developer for cloud environment needs to consider the code of the function, namely f, and apply it on the FaaS platform development tool, a native FaaS platform tooling, process, or tool may be referred to as a FaaS deployment tool. The FaaS platform tool may transparently, automatically or by applying manual instructions, wrap the function with features such as communication, interoperability, resource management and/or the like, enabling the function to be effectively executed on the FaaS platform, thereby generating the FasS function f.

Figure 6B:
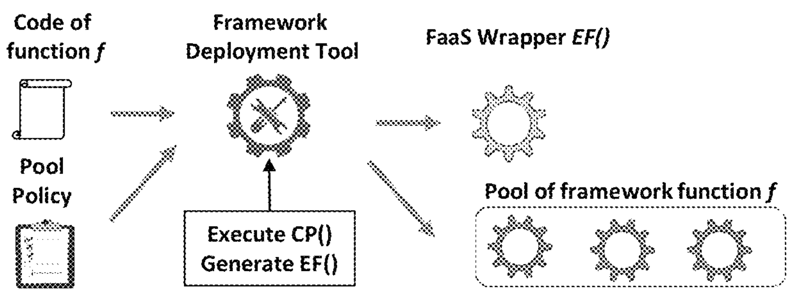
FIG. 6B shows an exemplary framework deployment on FaaS according to some embodiments of the present disclosure.

Referring now to FIG. 6B which shows an exemplary framework deployment on FaaS according to some embodiments of the present disclosure.

A developer for cloud environment needs to consider the code of the function, namely f, and apply it on the disclosure framework deployment, which may comprise an additional FaaS platform development tool. Optionally, a developer for cloud environments needs to also consider special application requirements, such as scheduling, mode of execution, data access etc which together may comprise a pool policy. Optionally, a framework development tool may be used to integrate the development process of the two framework API functions described above in FIG. 5. The framework development tool first invokes CPO, which receives the pool policy and the function identifier, definition or the like, f, and creates a pool with the specified policy and returns a unique identifier of the pool (CP(policy, f)→pool_id). The pool may comprise any non-negative integer number of custom runners (CRs). Then, the framework deployment tool may generate a serverless wrapper function f', as discussed in FIG. 3*b*, which has encoded inside the unique identifier of the pool associated with the function, and bears the same signature as the original function f. When f' is invoked with function parameters, it returns the generalized return value which may be the results of the function f invoked with said parameters inside a CR in the pool. This may happen by having the f' function internally invoke the EF( ) API function with the encoded pool identifier pool_id and the invocation parameters: EF(pool_id, parameters)→result. Application of the generalized return value may refer to responding to the function call with the result, updating a shared memory, generating another event, and/or the like.

The process as described in FIG. 6B may be supported by an integrated development environment, also referred to as the second deployment tool. The second deployment tool may be consistent with the first deployment tool, such as "wsk" tool in OpenWhisk, and useable for creating pools of function instances using the above functions of CP( ) and EF( ) described above.

A pool policy may be defined for satisfying goals such as throughput, deadlines, fairness and others typically involves using a suitable scheduler and/or execution model, such as overhead mitigation—e.g., executing initialization and finalization outside the critical invocation path.

Predictable execution may be coupled with a deadline-aware, real-time scheduler for a complete real-time execution system. Some scheduling algorithms are known to the person skilled in the art. To leverage the overhead mitigation of pre-initialized functions, the controller may maintain a pool of framework functions f which were pre-initialized to be invoked on demand. For example, in response to events or invocations.

This is required so that the critical response time includes only the core computation, and not the initialization part or finalization part. This pool may be managed according to a policy that controls how the pool scales out or in in response to demand (invocations/events). For example, the pool may dynamically grow to handle bursts before they occur, for example by using demand prediction.

The pool may consist of any non-negative integer number of CRs with functions whose initialization part has already been executed and its resulting objects are in-memory, and the computing resources such as memory ranges, communication channels and/or bandwidth, one or more central processing units, graphical processing units (GPUs) and/or the like are allocated to the customized platform level process. The pool itself may be allocated directly by invoking CRs as FaaS functions, or provisioned from an intermediate pool of blank CRs not yet executing any specific function. The controller may be responsible for selecting invocations based on its internal scheduler, evaluating priority, urgency, and/or the like, and assigning them to selected CRs from the pool. Followingly, the controller may communicate with each selected CR through its secondary interface, and may send it the associated invocation request including the function parameters.

The controller's selection of CRs may also be affected by a time-out of CR execution. Most FaaS platforms restrict the execution time of serverless functions according to a user-configured policy, up to some limit set by the provider for example, 5 or 15 minutes. Since CRs are serverless functions, they are subject to this limitation as well. To guarantee completion of a predictable function f, a controller needs to select a CR whose remaining execution time is not shorter than that of f, according to a constraint such as a deadline or a limit set by the user, or according to some prediction logic. The controller may also automatically replenish a pool's CRs to meet a stable pool scale goal despite CRs being terminated due to FaaS time-outs.

Given the controller's responsibility for maintaining a pool of CRs and assigning function invocations across CRs in a pool, it may maintain operational state across all invocations, consisting of scheduling information, pool management data, and the likes. Consequently, one possible embodiment of the controller is as a stand-alone service running outside the FaaS platform with its state in memory. Another embodiments may include embedding the controller as a library in a long-running component of the pool client application itself. Optionally, a controller may maintain one or more function graph, and the function generalized return value may also comprise updating one or more states of controller function graphs.

It should be noted that is an exemplary description and variations such as creating several pools for a function, a pool for more than one function, other methods of linking pre-initialized runners to functions and function calls, and the like, may be apparent to the person skilled in the art, and are within the scope of the claims.

Figure 7:
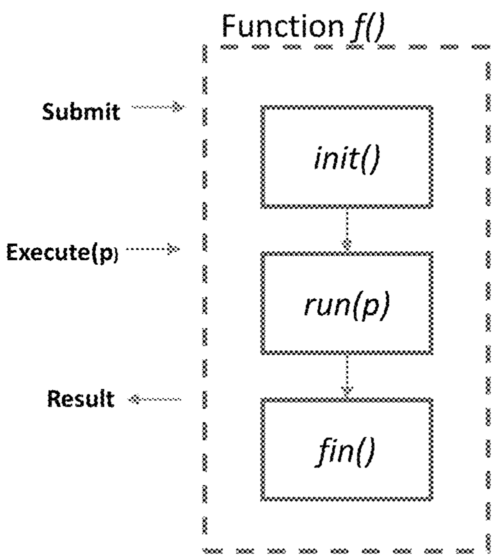
FIG. 7 shows an exemplary function partition, according to some embodiments of the present disclosure.

Reference is now made to FIG. 7 which shows an exemplary function partition, according to some embodiments of the present disclosure.

To allow our framework to execute initialization and finalization parts of a function f( ) outside the critical path, the function f( ) may be divided into 3 generally-named sub-functions: init( ), run( ) and fin( ), matching the initialization, main computation and finalization parts of the function, respectively.

In the disclosed system, at least one function is executed in a mode, wherein the function is split to three parts, each part having different at least one part bound to different events. It should be noted that several other methods of splitting the function may be apparent to the person skilled in the art, for example to two or four parts. At least one part comprises at least one initialization step, comprising allocating computing resources to the customized platform level process, at least one part comprises an execution step, applying the generalized return value in response to the different event, and at least one part comprises freeing the computing resources and terminating.

The init( ) function should execute ahead of the main computation and may be executed before the parameters of f( ) are known. Thus, its parameters are assumed to be independent of the invocation parameters. This function may be used for the initialization step, comprising allocating computing resources to the customized platform level process. run( ) is a service function, for executing the function service using the allocated computing resources, and is the main computation, executed with the parameters of f( ), in response to invocations. The service function may be executed by the same or by a different process, in the latter case it may be also executed on the same node, or involve one or more additional nodes. Followingly the CR receives the generalized return value from the run( ) executed by the service function and applies the generalized return value in response to the event, or example by returning a result through the secondary interface. run( ) may use the output of init( ) or some runtime objects created by init( ) thus reducing its own execution time. Last, fin( ) is executed by the CR after the result is returned or written. This is because fin( ) is intended for doing non-critical cleanup after the result is computed, such as releasing connections and freeing resources. Thus, its execution time need not be encumbered inside run( ).

The execution of fin( ) may be further deferred beyond consequent function executions until the CR needs to shut down, for example, to allow sharing of initialized objects across many function invocations in a sequence. Note that each of the sub-functions may be relayed any special parameters from the underlying FaaS platform for a consistent FaaS development experience. The finalization may be triggered by an event from the custom controller on an additional computing node. The custom controller may send instructions to the specialized executor function to perform finalization, comprising freeing the computing resources and terminating.

The finalization, or shutdown of the CR, and optionally the customized platform level process may be controlled by the CR itself, or occur when the framework controller transmits, optionally from an additional virtual machine, instructions to the CR to free the computing resources and terminate.

Some implementations comprise mapping the above structure to a stateful computation. The framework controller may implement a mapping, for allocating events bound to the function service to the CR, or the specialized executor function called from the customized platform level process, according to a mapping rule. Similarly, the framework controller may implement a scheduling, for allocating service requests to the CR according to a user-customizable scheduling rule.

The function init( ) may be related to allocation of resources required for execution of the run( ) function, using the allocation of computing resources to the customized platform level process. For example, when the function f( ) deals with processing an event by updating some statistics in a database, init( ) may comprise opening the database connection. Followingly, run( ) may comprise reading the statistics record that matches the event, updating it and writing it back. And lastly, fin( ) may comprise closing the database connection.

In artificial intelligence (AI) context, init( ) may comprise allocating VRAM space and loading a neural network into it, run( ) may comprise feeding the input to through the neural network and returning the inference, and fin( ) may comprise releasing the allocated VRAM space. In that context, the neural network may be loaded once and applied to multiple samples in sequence.

The above implementations are provided as examples and it may be apparent to the person skilled in the art that the structure may be applied to many computing resources such as storage, communication bandwidth, dedicated logic, and the like, and such implementations are within the scope of the claims.

The pool generated by the framework controller may contain any non-negative integer number of CRs. A CR may operate in two stages, generally referred to as submit and execute. At the submit stage, CR receives only the code of f (or a pointer to a locally-deployed code of f), deploys it and executes init( ), while maintaining the runtime objects that it creates, for example in local process memory, or in a local disk providing virtual memory in the node whereon the CR is executed. Following the initialization stage, the CR may be idle, without exiting as a FaaS function, and wait for an execution request from the scheduler over the secondary interface. When the request is received, for example through a wrapper function, it triggers the execute stage. Then, the invocation parameters p are extracted from the request and received by the CR through the secondary interface. Followingly the CR executes run(p) and possibly returns a generalized return value, for example a result which may be transmitted from the specialized executor function to the caller by the framework controller. After the execute stage is complete, CR may execute the fin( ) function immediately, or defer it to the time it needs to shut-down, depending on configured policy, which may be either determined locally by the CR or as instructed by the framework controller.

The framework may also be used for direct invocation and orchestration to invoke a predictable function f, by following the first two setup steps of the event-response use-case, ending with the creation of EF( ) which may be invoked like other serverless functions. Another exemplary use-case is invoking f from a FaaS orchestrator, in the context of a workflow. While this is essentially the same as a standard invocation, additional value may be extracted by selectively positioning both CP( ) and EF( ) for each pool in the workflow. Creating a pool may entail FaaS usage costs from the creation point on because a pool may maintain a minimal set of CRs, and thereby FaaS functions, always running Thus, to minimize costs, CP( ) should be called as closely as possible to the initial invocation of EF( ) for the same pool. On the other hand, to improve predictability of an entire workflow, or the segment consisting of real time functions, all pool initializations should be done prior to invoking the workflow or the segment.

The framework described may be used for adding other non-trivial features in a portable fashion to a FaaS platform. Heterogeneous hardware support is one example. The framework may be used to add support for functions that execute on top of additional hardware not supported by the underlying FaaS, such as GPU, dedicated logic, FPGA, ASIC, or different kinds of CPU, having a different ISA, or other compatibility issues. The CRs may have to run directly inside infrastructure as a service (IaaS) resources, for example using containers, running on top of the additional hardware. The custom scheduler would directly control the container pool size, scaling out or in either on demand or based on demand prediction.

A shared state is a scenario that makes a function code reach out to external state services throughout its execution. Extending functions code with client libraries for a state service may be a naïve practice for stateful computation on cloud systems. However, maintaining a specific consistency model across different function invocations, for example in the same workflow requires controlled propagation of version data that is synchronized with the code deployment, and optionally with function initialization. Performing this transparently to function code requires cooperation between a controller and the function runtime, obtainable using custom runners, as the proposed framework enables.

Some prior art demonstrates the value of colocation-based scheduling strategy for reducing overhead for serverless workflows by collocating functions with shared data concurrently or sequentially in the same container. Colocation-based scheduling may be accomplished on top of an existing FaaS using the proposed framework by leveraging the CRs that may execute more than one function concurrently, for example by allocating multiple threads or processes, and relying on CR life-cycle being independent of the executed functions, thus allowing CR reuse for different functions. Another aspect is creating a custom scheduler that may leverage data usage information of functions for scheduling. Note that these features may be implemented without predictable execution, or overhead mitigation, so it does not require pooling of CRs, and may work with regular function code, without splitting into sub-functions.

The framework may allow scheduling a function across multiple instances of FaaS, even across different FaaS types, since the CR serves as an adaptor between the serverless function and the FaaS environment. Multi-FaaS scheduling may be beneficial in various scenarios. Leveraging multiple FaaS instances may help in increasing available FaaS capacity. For example when using fog computing, function execution may be selectively directed to edge instances or cloud instances, depending on the balance between capacity and proximity to data origin. In a large-scale deployment, functions may be deployed based on network proximity to data. Similarly to colocation, this feature may be implemented independent of predictable execution and its associated implications such as pooling and code split.

It is apparent to the person skilled in the art that variations of the above examples and framework description may be developed, and are within the scope of the claims.

Reference is also made to FIG. 8 which demonstrates a sequence of regular monolithic execution of an exemplary serverless function from beginning to end on the left or top, and a partitioned execution of the same exemplary function using the disclosure framework according to some embodiments of the present invention on the bottom or right, according to some embodiments of the present disclosure;

The figure depicts two scenarios: "Regular Serverless Function Life-Cycle" and "Disclosure Framework Function Life-Cycle", thereby showing the trade off as more predictability, or real time performance are at the cost of longer resource use.

Both scenarios show two function calls, being executed on the same container in each scenario, as timeline is from top to bottom. The container life cycle is marked by the solid filled bar.

The dotted bar shows the life cycle of the CR, an extra layer enabling the predictable performance improvement by the function splitting at the cost of another interface layer, which may counter the intuitive practices known to the person skilled in the art for speed improvement.

When Determined by the framework controller, or the customized controller, the CR may start, after having the hosting container and FaaS runner initialized. When the event bound to the function service is triggered, generated, occurring or the like, and the framework controller transmits the function parameters, the function is executed on both scenarios. The controller may implement a mapping, for allocating events bound to the function service to the specialized executor function called from the customized platform level process according to a mapping rule, using a wrapper function, associated through the mapping.

The regular serverless service executes all the stages of the function, i.e. init( ) marked by the thicker, parallel to timeline, lines filled bar; run(p) marked by the thinner, perpendicular to timeline, lines filled bar; and fin( ) marked by the diagonal lines filled bar.

The disclosure framework executes the init( ) part of the function ahead of the actual invocation (e.g., using demand prediction), and maintains the results in the local memory. Therefore, following the invocation, the CR may only execute the run(p) part of the function and transmit the result to the framework controller, or directly to the invoking agent.

The following invocation is similarly processed by the disclosure framework. The regular serverless service also executes all the stages of the function before transmitting the result, however the init( ) stage may be shorter due to warm start.

The disclosure framework executes the fin( ) stage independently of specific invocations.

It should be stated that this sequence diagram is exemplary and many other sequences may result from the disclosure framework and other implementations.

Reference is now made to FIG. 9A which shows an exemplary code segment of a function, according to some embodiments of the prior art.

func1.py is a naïve serverless function implementation of an exemplary database access. The function includes an initialization of database connection, a read access from the database, closing the connection, and returning the result may count as the function generalized return value.

Reference is now made to FIG. 9B which shows a rewrite of the exemplary function shown in FIG. 9A, partitioned into 3 sub-functions to be used by the disclosure framework, according to some embodiments of the present disclosure.

func2.py is an exemplary framework function implementation of an exemplary database access. The function is split into three sub-functions.

The init( ) function opens the database connection. This stage may be time consuming despite its short description, due to communication overhead, queuing, semaphores, and the like.

The run(name) function receives a name as an input and queries the database for matches as shown. The run(name) functions returns the count, i.e. the number of the matching records.

The fin( ) function closes the database connection. Independently of specific function invocations.

It is expected that during the life of a patent maturing from this application many relevant distributed computing methods and practices will be developed and the scope of the terms cloud, virtual machine, function, process, platform, computing node, is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. It should also be reminded that the pool size, for example, may also be zero when no event bound to the associated function service is being handled or expected.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant that all publications, patents and patent applications referred to in this specification are to be incorporated in their entirety by reference into the specification, as if each individual publication, patent or patent application was specifically and individually noted when referenced that it is to be incorporated herein by reference.

In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system, comprising:

at least one computing node comprising one or more processor providing a plurality of users with a function as a service (FaaS) platform comprising a plurality of software function services, wherein the one or more processors when executed cause the at least one computing node to:

creating a FaaS framework comprising a host container, wherein the host container comprises one or more pools of pre-initialized serverless functions (f), a FaaS runner having a FaaS control interface through which the FaaS platform remotely controls execution of the one or more pools of pre-initialized serverless functions (f) over the FaaS runner, and a custom runner (CR) having a secondary interface, wherein the CR is interposed between the one or more pools of pre-initialized serverless functions (f) and the FaaS runner;

receiving, by invoking a first executable function operation, a pool policy parameter and a function identifier parameter for creating a pool of pre-initialized serverless functions (f);

creating, by invoking a second executable function operation, in the host container, the pool of pre-initialized serverless functions (f) running in the CR, wherein the pool of pre-initialized serverless functions (f) is created using the pool policy parameter and the function identifier parameter, and returning a pool identifier for the created pool;

extracting from an execution request to execute a software function service, invocation parameters including one or more function parameters received by the CR through the secondary interface;

invoking, by a third executable function operation using the returned pool identifier and the invocation parameters, an instance of function (f) running in the created pool, wherein the instance of function (f) is identified by the returned pool identifier, and the one or more function parameters are input to the identified function; and executing, by the CR, the software function service using the invoked instance of function (f).

2. A computer implemented method, using at least one computing node comprising one or more processors to provide a plurality of users with a function as a service (FaaS) platform comprising a plurality of software function services, wherein the one or more processors when executed cause the at least one computing node to implement the computer implemented method comprising:

creating a FaaS framework comprising a host container, wherein the host container comprises one or more pools of pre-initialized serverless functions (f), a FaaS runner having a FaaS control interface through which the FaaS platform remotely controls execution of the one or more pools of pre-initialized serverless functions (f) over the FaaS runner, and a custom runner (CR) having a secondary interface, wherein the CR is interposed between the one or more pools of pre-initialized serverless functions (f) and the FaaS runner;

receiving, by invoking a first executable function operation, a pool policy parameter and a function identifier parameter for creating a pool of pre-initialized serverless functions (f);

creating, by invoking a second executable function operation, in the host container, the pool of pre-initialized serverless functions (f) running in the CR, wherein the pool of pre-initialized serverless functions (f) is created using the pool policy parameter and the function identifier parameter, and returning a pool identifier for the created pool;

extracting, from an execution request to execute a software function service, invocation parameters including one or more function parameters received by the CR through the secondary interface;

invoking, by a third executable function operation using the returned pool identifier and the invocation parameters, an instance of function (f) running in the created pool, wherein the instance of function (f) is identified by the returned pool identifier, and the one or more function parameters are input to the identified function; and executing, by the CR, the software function service using the invoked instance of function (f).

3. A non-transitory computer readable medium having instructions stored thereon, which, when executed by one or more processors of a computer, cause the computer to provide a plurality of users with a function as a service (FaaS) platform comprising a plurality of software function services, wherein the instructions comprise:

creating a FaaS framework comprising a host container, wherein the host container comprises one or more pools of pre-initialized serverless functions (f), a FaaS runner having a FaaS control interface through which the FaaS platform remotely controls execution of the one or more pools of pre-initialized serverless functions (f) over the FaaS runner, and a custom runner (CR) having a secondary interface, wherein the CR is interposed between the one or more pools of pre-initialized serverless functions (f) and the FaaS runner;

receiving, by invoking a first executable function operation, a pool policy parameter and a function identifier parameter for creating a pool of pre-initialized serverless functions (f);

creating, by invoking a second executable function operation, in the host container, the pool of pre-initialized serverless functions (f) running in the CR, wherein the pool of pre-initialized serverless functions (f) is created using the pool policy parameter and the function identifier parameter, and returning a pool identifier for the created pool;

extracting, from an execution request to execute a software function service, invocation parameters including one or more function parameters received by the CR through the secondary interface;

invoking, by a third executable function operation using the returned pool identifier and the invocation parameters, an instance of function (f) running in the created pool, wherein the instance of function (f) is identified by the returned pool identifier, and the one or more function parameters are input to the identified function; and executing, by the CR, the software function service using the invoked instance of function (f).

* * * * *